(12) United States Patent
Geiger et al.

(10) Patent No.: US 6,377,810 B1
(45) Date of Patent: Apr. 23, 2002

(54) METHOD OF OPERATION OF MOBILE WIRELESS COMMUNICATION SYSTEM WITH LOCATION INFORMATION

(75) Inventors: Robert L. Geiger, Algonquin; Miles R. Jackson, North Barrington, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/330,739

(22) Filed: Jun. 11, 1999

(51) Int. Cl.[7] .............................................. H04Q 7/20
(52) U.S. Cl. .................................. 455/456; 342/357.09
(58) Field of Search ................................ 455/456, 457, 455/11.1, 410, 411; 342/357.01, 357.06, 357.09, 357.13

(56) References Cited

U.S. PATENT DOCUMENTS 6,055,429 A * 4/2000 Lynch ........................ 455/11.1
6,104,931 A * 8/2000 Havinis et al. ............. 455/456

* cited by examiner

Primary Examiner—Lee Nguyen
(74) Attorney, Agent, or Firm—Hugh C. Dunlop; Hisashi D. Watanabe

(57) ABSTRACT

Location information is generated for a mobile device using a global positioning system (GPS) receiver (17) or by other means. A request for receipt of location information is received at the mobile device, over a wireless communications channel from a requesting entity (25), and a confirmation of permission to receive location information is sent to the requesting entity, over the wireless communication channel. The confirmation includes a digital signature for the requesting entity to use as verifiable proof of confirmation of permission. The requesting entity can use the digital signature to obtain the location information from a location server (21). The requesting entity and/or the location server are optionally located in the mobile communications device.

17 Claims, 4 Drawing Sheets

METHOD OF OPERATION OF MOBILE WIRELESS COMMUNICATION SYSTEM WITH LOCATION INFORMATION

FIELD OF THE INVENTION

This invention refers to a communication system and a method of operation of a mobile wireless communication system in which location information for wireless devices is maintained in the system.

BACKGROUND OF THE INVENTION

In wireless communication systems, such as a radio or telephone system, it is now possible, by various means, to track the location of mobile devices across geographical terrain, for example using a global positioning system (GPS) receiver in the mobile device that generates accurate location information in a manner well known in the art. This location information can be delivered over the wireless link to the fixed network and stored on a location server. This location information is particularly useful for emergency services, for example, such that a mobile user calling an emergency service can be quickly located and a police or rescue vehicle can be dispatched to the location of the mobile user. Location information for mobile telephone users is also of commercial value, and there is the possibility of many entities other than state and local police forces requesting access to location information. However, this information is also highly private and sensitive from the point of view of the mobile user, who may not wish the location information to be made available without his permission.

There is a need for a wireless communication system with location information that allows the user of a mobile device to have greater control over use of information relating to the location of his or her mobile device.

DETAILED DESCRIPTION OF THE DRAWINGS

Figure 1:
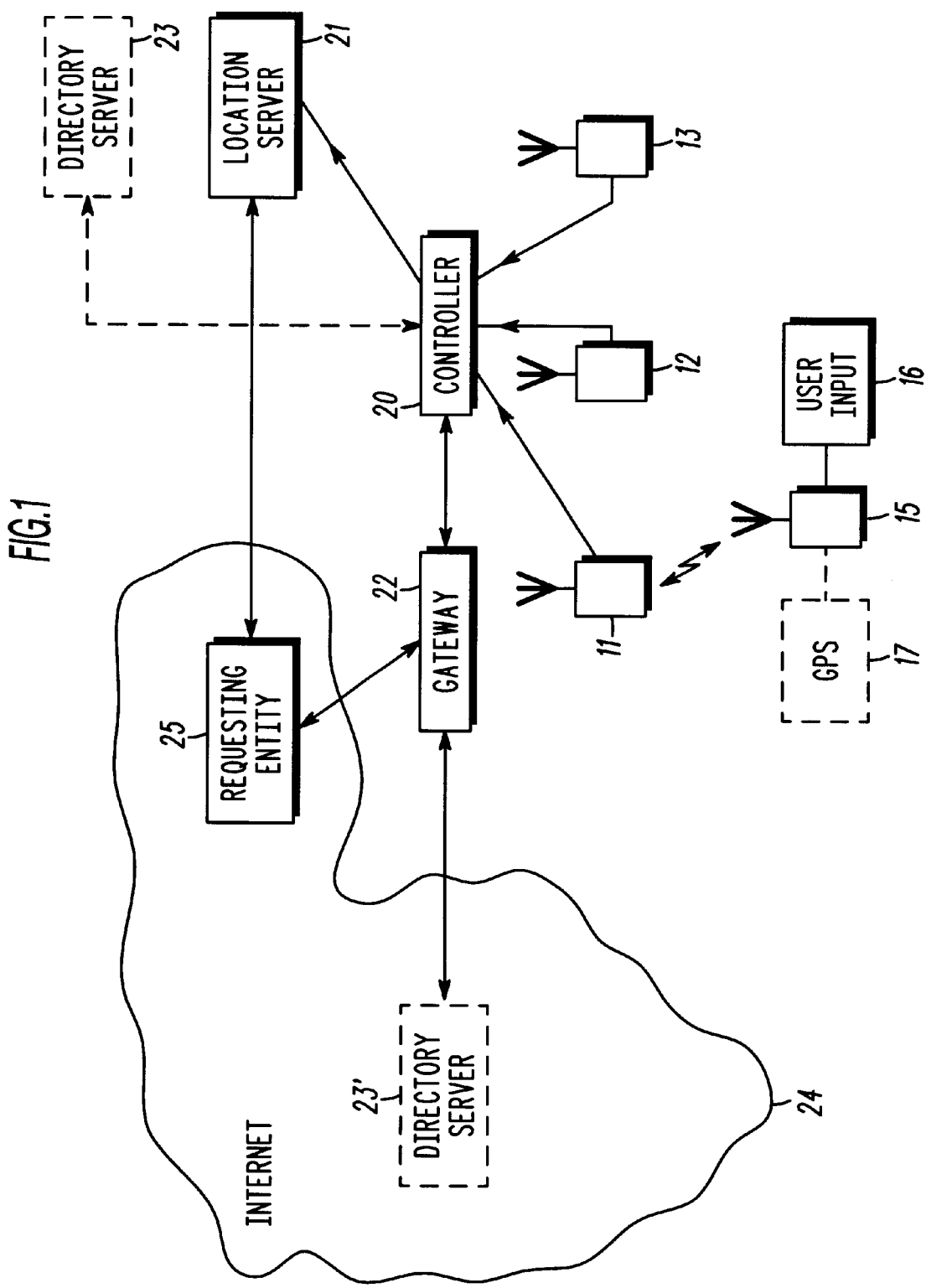
FIG. 1 is a block diagram illustrating a communications system in accordance with a preferred embodiment of the present invention.

Referring to FIG. 1, a two-way wireless communications system such as a cellular mobile telephone system (for example a Global System for Mobile Communication digital cellular radio system) or a two-way paging system (for example a ReFlex™ paging system) is shown having a number of base stations 11, 12 and 13 dispersed across a geographic region. In communication with these base stations is a mobile device 15, which is one of a large number of mobile devices in the system. The mobile device has a user input 16, which may simply be a keypad, and it optionally has a location receiver 17, such as a GPS receiver. The infrastructure of the communications system has a controller 20, which is in communication with the base stations 11, 12 and 13 and is connected to a location server 21. There is also a messaging gateway 22 that is in communication with the base stations 11, 12 and 13. This communication may be direct, or may pass through the controller 20. For illustration purposes, the simpler connection through the controller is shown. A requesting entity 25, that may be located in an internet 24, is able to communicate with the mobile device 15 through the gateway 22, and it communicates with the location server 21.

Also shown in FIG. 1 is a directory server 23 connected to the controller 20. The directory server 23 is shown in phantom outline to illustrate that it is optional. It is also illustrated in phantom outline as directory server 23' to indicate that it may be located in the internet 24.

The requesting entity 25, and location server 21 of FIG. 1 are software components. They may reside in any computer with access to the mobile communications network including, but not limited to, residing within the mobile device 15, the controller 21 or any computer connected via the gateway 22. These variants are described below.

In operation, the mobile device 15 establishes communication from time to time with one or more of the base stations 11, 12 and 13. In doing so, the controller 20 establishes location information for the mobile device 15. This location information can be established in one of a number of ways. The most simple way is by the controller 20 simply monitoring the particular base station with which the mobile device 15 is in communication, thereby identifying the approximate region of operation of the mobile device 15. Another method is by triangulation using signals from the mobile device 15 to more than one (preferably at least three) base station. Triangulation provides more accurate location information, but is not possible in all systems and requires that the mobile device is able to be detected by more than one base station. A very accurate method of location identification is by provision of a GPS receiver 17 at the mobile device 15, which provides location information at the mobile device itself and this location information is transferred from the mobile device 15 to the controller 20 through the base station with which the mobile device is in communication (in this case illustrated as base station 11). In each case, the controller 20 delivers the location information to a location server 21 where location information for many different devices is accumulated. The location server 21 maintains location information for each individual mobile user i.e, it maintains a table correlating device or user identification numbers with location information.

In accordance with the present invention, the mobile device 15 has a unique encryption key, which it can use to generate digital signatures. A digital signature is generated using a mathematical procedure well know in the art (example are the NIST approved Digital Signature Standard).

In a common method of performing digital signature operations a hash of the message is taken by processing the message with a one way function. A one way function has the property of producing a finite number of bits of output for an arbitrary number of bits of input and, given available computing power within the expected usable life of the hash, it is infeasible to determine the input message from the output of the hash function. The precise characteristics for such a function to be used are well known in the art and specified in several national and international standards. The output obtained by processing the message with the one way (hash) function is then input to the signing part of a two part cryptographic algorithm along with the private key of the signer. This produces as output a finite length bit string(s) which is a digital signature. The second part of such an algorithm is the verification part. The cryptographic algorithm has the property that an entity with the public key mathematically related, in a manner well known in the art of public key cryptography, to the signer's private key may verify that the holder of such a private key actually digitally signed the message. This verification is commonly done by once again hashing the message and then running this output through the verification part. Input to the verification part includes the message hash, (supposed) signer's public key, and the digital signature. The verification part outputs either valid or invalid. An output of valid indicates that the holder of the private key mathematically related to the public key actually produced this digital signature with the corresponding private key as input to the signing part of the cryptographic algorithm. In practice the public key is bound to an entity by a certification process, which is well known in the art of public key infrastructures. This certification process binds an identifier or name for an entity to a public key in the form of a certificate, as is well known in the art.

An attribute, for the purposes of this invention, is defined to be a right, information about, or characteristic of, an entity. An attribute certificate, for the purposes of this invention, is defined to be a statement binding an attribute to an entity or granting access to an attribute by an entity, via the identifier for the entity (optionally including constraints such as a time or geography validity—i.e. a certificate that is valid for one or more specified time periods or within certain geographic parameters). This binding is accomplished by a signature on the attribute certificate. For example an entity may grant access to its location information (an attribute of the entity) to another entity via an attribute certificate.

The mobile device has a private key and corresponding mathematically related public key in order to generate digital signatures. The public key of the mobile device 15 is signed by a system certification private key; i.e. the mobile device 15 possesses a certificate for this public key. The location server 21 has the corresponding public certification key and can use it to verify the signature on the public key of the mobile devices 15 certificate, thus verifying that this public key is properly associated with the mobile device 15 within the security domain. The public key of the mobile device 15 may be sent to the location server 21 by the mobile device 15 or obtained via a directory or database lookup. The location server 21 uses the public key of the mobile device 15 to identify whether a digital signature delivered by the mobile device 15 has indeed originated from the mobile device. This is done by using the cryptographic algorithm signature verification part to determine that the private key corresponding to the public key of the mobile device 15 was used in the signing part of the cryptographic algorithm to generate the signature.

In operation, a requesting entity 25 that wishes to know the location of the mobile device 15 establishes communication with the mobile device 15 via the gateway 22 and the base station 11. This communication is established using a data connection, one example being a TCP/IP connection. The requesting entity 25 sends to the mobile device 15 a location permission request. This request is sent in the form of a system location permission request data message. The requesting entity 25 preferably includes a digital signature of the location permission request message in the location permission request. Preferably the digital signature of the requesting entity is from a security domain in which the user of the mobile device 15 is also a member, i.e. the requesting entity and the mobile device share a common root key in the domain of the requesting entity. An example would be that the requesting entity is the employer of the mobile device user and the organization including the employer and the employee have a common root key. If the requesting entity 25 has signed the message, and the mobile device 15 does not already have the certificate 25 of the requesting entity, or a means to obtain such a certificate, the requesting entity 25 must send this certificate to the mobile device 15 along with the location permission request.

The mobile device 15 receives the location and permission request and verifies the identity certificate of the requesting entity using the certification key in the requesting entity domain. Verification is carried out by hashing the message and inputting the resulting hash output, the certified public key of the requesting entity, and the digital signature, into the verification part of the cryptographic algorithm. If the user 16 agrees with the request for location information, the user enters an input at the user input 16, which causes the mobile device 15 to generate a location access permission attribute certificate granting permission to the requestor. This certificate includes a digital signature generated by the mobile device 15 using the root key of the mobile communication system domain, that is the domain that is common between the mobile device 15 and the location server 21. The mobile device 15 sends this location access permission attribute certificate to the requesting entity 25 in the form of a location access granting data message on the return channel through the base station 11 and the gateway 22.

On receipt of the location access permission attribute certificate, the requesting entity 25 establishes communication with the location server 21, for example by establishing a TCP/IP data or Secure Sockets Layer (SSL) connection, and sends the location access permission attribute certificate to the location server 21 with the request for the location of the mobile device. If the location server 21 does not have the requesting entity's public key certificate or a means to obtain it from directory server 23 or 23', requesting entity 25 also sends its public key certificate to verify its identity to the location server 21. The requesting entity 25 identity certificate includes a digital signature that is generated using a private certification key for a domain that is common to the requesting entity 25 and the location server 21.

Figure 2:
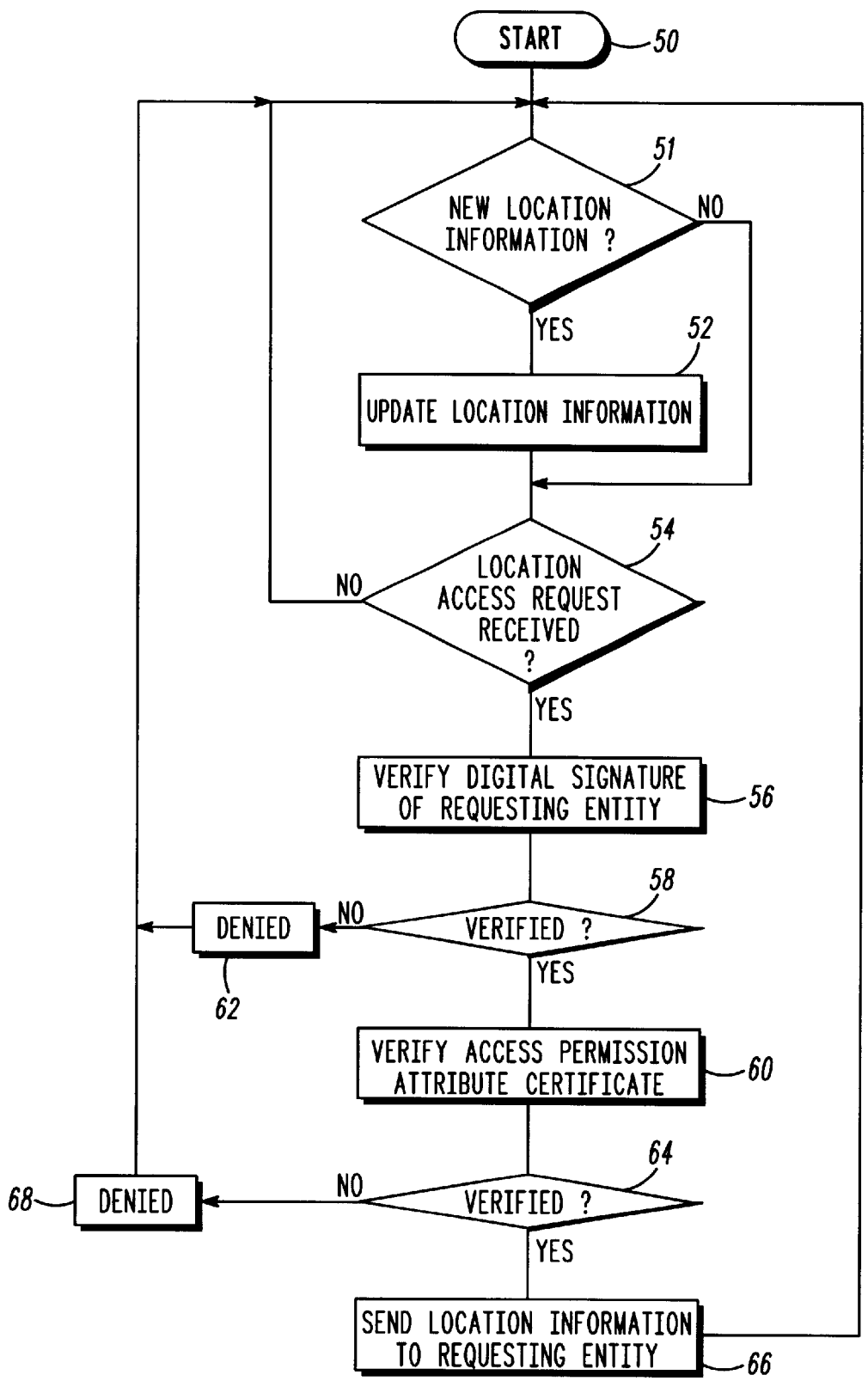
FIG. 2 is a flow diagram illustrating operation of a computer program executed at the location server of FIG. 1.

At the location server 21, a process illustrated in FIG. 2 is carried out. New location information for the mobile device 15 (and other mobile devices) is continuously received and updated in steps 51 and 52. Upon receipt of the location access request from the requesting entity 25 in step 54, the following steps are taken. First, in step 56 (if a requesting entity identity certificate is used) the location server 21 verifies the digital signature of the requesting entity using the root key that is common to the requesting entity 25 and the location server 21. If verification succeeds in step 58, the location server 21 proceeds to the next step (step 60). Otherwise, an "access denied" message is returned to the requesting entity in step 62.

If a requesting entity identity certificate is not used, steps 56, 58 and 62 are omitted. The steps that follow are executed in either case.

In step 60, the location server 21 verifies the location access permission attribute certificate received via the requesting entity 25 from the mobile device 15. This certificate is validated by verifying (as described above) the digital signature of the mobile device using the certification key that is common to both the location server 21 and the mobile device 15. If verification is successful in step 64, the location server 21 sends the location information to the requesting entity 25 in step 66 (preferably in encrypted form). The process is then complete and can return to the beginning (step 50). If verification is not successful in step 64, an "information denied" message is sent to the requesting entity 25 in step 68.

A preferred feature of the invention (but not an essential feature) is that the location access permission attribute certificate from the mobile device has a validity that is limited in time or in geography or both. The certificate includes one or two (or more) attributes that identify the time validity of the certificate and the geographical area. These attributes are digitally signed using the private key of the mobile device that is from the domain that is common to the mobile device and the location server, so these attributes cannot be changed by the requesting entity without this being detected by the location server. They can, however, be verified by the location server using the digital signature verification algorithm as is known in the art.

Included in the certificate attributes can be one or more constraints, for example a time constraint. Thus, a location access permission attribute certificate expires after its expiry time and will not be used by the location server if that time has passed or if the mobile device 15 is outside the logical area or geographic area for which permission is granted.

Figure 3:
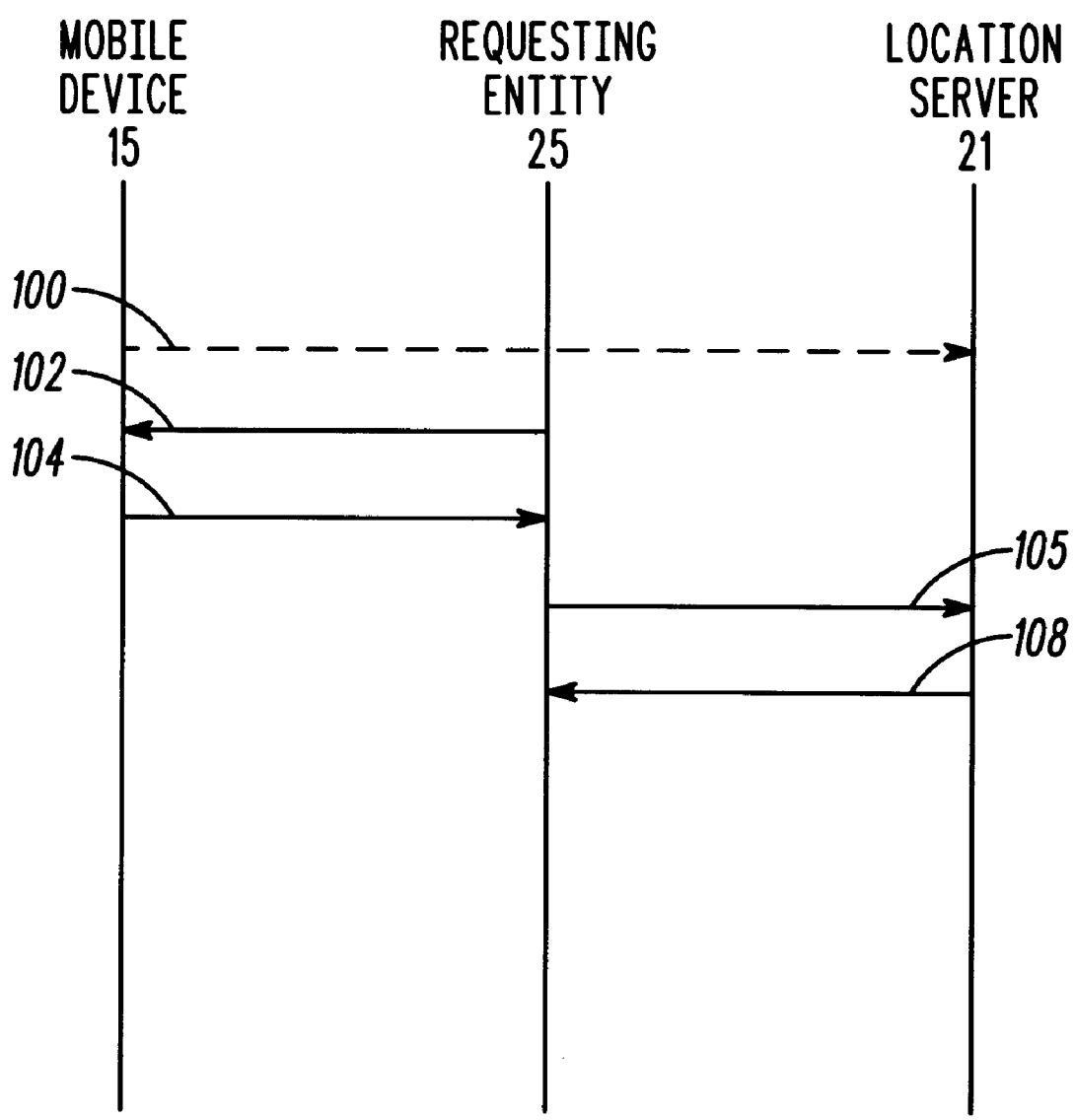
FIG. 3 is a message flow diagram illustrating exchanges of messages between elements of the system of FIG. 1.

An alternative and useful constraint is a periodic time constraint, for example granting permission for location information access during work hours and denying this outside work hours. In this manner, the time constraint provides for periods of unauthorized access between periods of authorized access. The periods of authorized and unauthorized access may depend on time of day or on calendar day or both. FIG. 3 illustrates in diagrammatic form the steps already described above. In step 100, the mobile device provides its GPS location information to the location server (unless the location server obtains this information by one of the other methods described above). In step 102, the requesting entity 25 sends its location permission request to the mobile device 15 (together with any requesting entity identity certificate) and in step 104 the mobile device replies (if the user so permits and if the requesting entity identity certificate is valid) with a location access permission attribute certificate. The requesting entity 25 delivers this certificate to the location server 21 in step 106 and, if the attributes of the certificate are valid (i.e., the digital signature on the attribute certificate is valid, the attributes are within acceptable ranges, and are correctly formatted) and if the location server 21 validates the location access permission attribute certificate, the location server 21 provides the requesting entity 25 with the location information in step 108 (preferably in encrypted form).

Thus, a method and system have been described by which a user of a mobile device provides permission to the requesting entity by creating and signing the attribute certificate containing a location permission attribute of the user's device for a specific time window and optionally for specific geographic regions. This attribute certificate is issued to the entity requesting the location information for which the user has decided to allow access. A location server receiving a request for location information from an entity that provides such a correctly authorized attribute certificate securely sends this information to the requesting entity. This transfer is secured by either establishment of a secure session using a key exchange mechanism to create a session key or by encrypting the information with the requesting entities public encrypting key.

In countries where the law requires location information to be released to legal authorities, the location server can honor a request with valid signature from such an identified legal authority.

It has been described that the requesting entity 25 and location server 21 of FIG. 1 are software components and may reside in any computer with access to the radio communications network including, but not limited to, residing within the mobile device 15, the controller 21 or any computer connected via the gateway 22.

Figure 4:
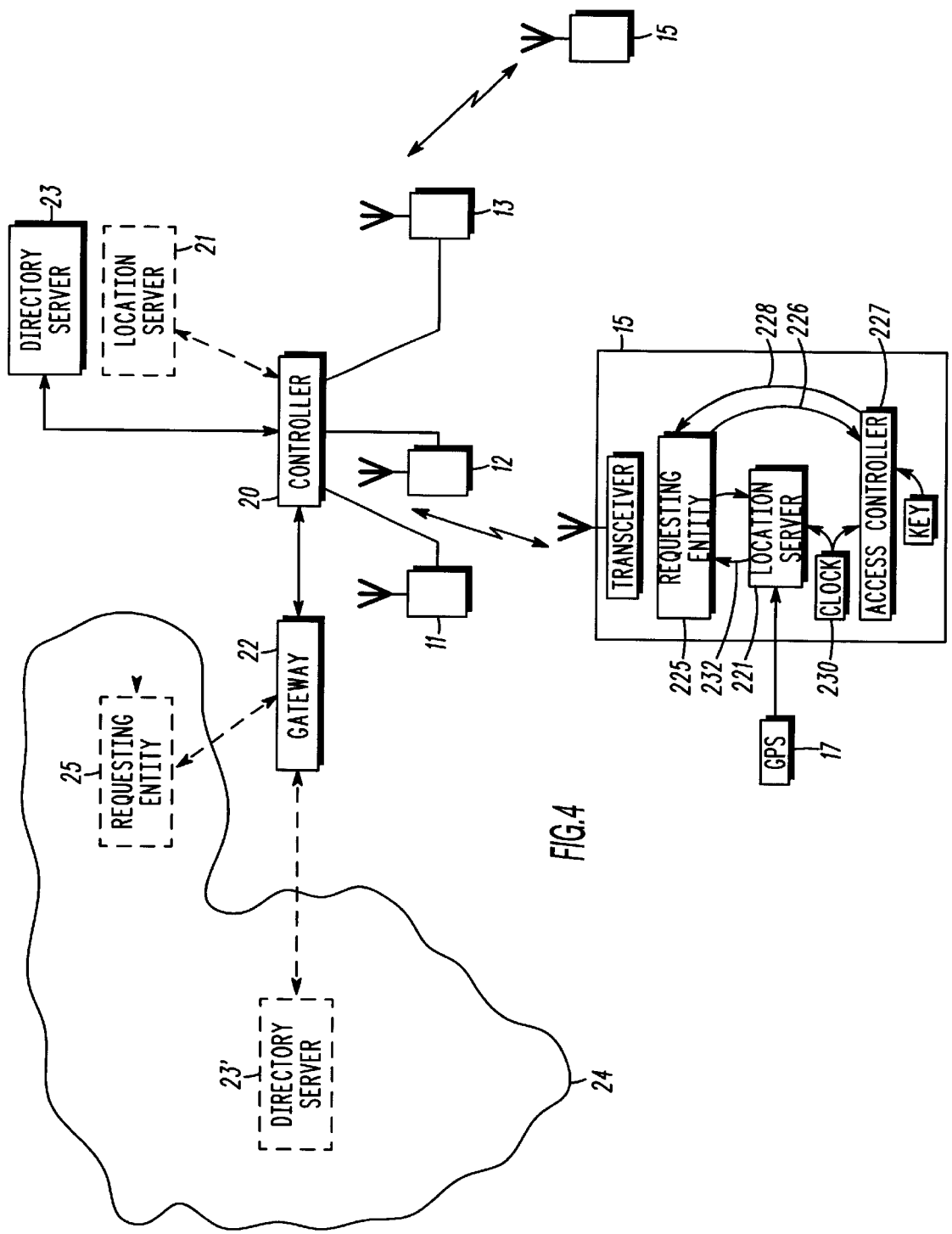
FIG. 4 is a block diagram of the communications system of FIG. 1 in an alternative configuration.

The example where the requesting entity and location server are both located in the mobile device 15 is illustrated in FIG. 4. In that figure, the requesting entity is illustrated as a program 225 running on the mobile device 15. The program has been downloaded from the internet 24. As a downloaded program, it does not have access to the other information on the mobile device. In order to access the location information, it makes a request to the location server program 221, which in this example is also a program running on the mobile device. The only part of the request processing which is not entirely within the mobile device in this example is the client certificate request and reply which must come from the directory server 23 or 23' (and which is optional).

In operation, the requesting entity 225 sends its location access permission request 226 to access controller program 227, which responds (if so selected by the user) with a location access permission attribute certificate 228 that optionally contains time and geography constraints. For the time constraint, the access controller program can obtain date and time information from a clock 230. The requesting entity program then sends a location access permission request 229 to the location server program 221, with the location access permission attribute certificate and the requesting entity identity certificate. The location server program 221 verifies the requesting entity identity certificate by sending a message over the wireless communication link to the directory server 23 or 23'. Upon verification, the location server program 221 then verifies the location access permission attribute certificate, using geographic information from its database (or other source) to verify the geographic constraints and using a time and date indicator from the clock 230 to verify the time constraints. If verified, the location server program 221 delivers location information 232 to the requesting entity program 225.

The location server 221 obtains the location information in the same manner as it would if it were located in the communications network infrastructure. It obtains the information from the GPS receiver (or other receiver) 17 or from the controller 20 (or a combination of both).

In the case where the location server 221 tracks location information for other mobile devices 215, these devices deliver their location information to the location server in the same manner as before (or the controller 20 delivers it to the location server), except that in the case where the location server is located on the mobile device 15, the identity of the mobile device 215 and its corresponding location information have to be put in a message packet and delivered to the mobile device 15 over a packet radio channel (e.g. a short message service channel) or a call has to be placed to the mobile device 15 to deliver the message packet.

In the case where the location server 221 tracks location information for other mobile devices 215, a request for access to the location of another mobile device 215 is first sent to the other mobile device 215, and the access controller program of that other mobile device provides a location access permission attribute certificate which is delivered over the wireless link to the mobile device 15 and tendered to the location server 221 for access to the location information of the mobile device 215. When the location access permission attribute certificate is verified, the location information is delivered to the requesting entity. If the requesting entity is in the mobile device 15, it is delivered internally form the location server program 221 to the requesting entity program 225. If the requesting entity is in the internet 24 or on the mobile device 215, the location information is delivered over the wireless link to the requesting entity.

Providing a location server on a mobile device creates a new and useful feature in fleet management. For example, a fire chief can have a mobile device 15 with a location server serving many other mobile devices 215 of other fire officers. The fire chief has the ability to obtain location information for all the fire officers from his or her mobile device, i.e. without having to contact a server in the infrastructure that would otherwise introduce delay and complexity. The fire officers do not lose the ability to maintain privacy when off duty, because they can set constraints It will be understood that the location server 221 may be located on the mobile device 15 and the requesting entity located in the communications network infrastructure. Alternatively, the requesting entity is located on the mobile device 15 and the location server is located in the communications network infrastructure.

A mobile wireless communications system, a mobile device and a method of operation of these has been shown in various aspects and variations, by way of example. Other modifications of detail can be made by one of ordinary skill in the art without departing from the scope and spirit of the invention.

What is claimed is:

1. A method of operation of a mobile device of a mobile wireless communications system comprising:
    receiving, at the mobile device, over a wireless communications channel, a request for authorization of receipt of location information from a requesting entity; and
    sending to the requesting entity, over the wireless communication channel, an authorization for access to location information, which includes a digital signature verifying the user's authorization of access.

2. The method of claim 1, wherein the digital signature comprises data encoded with a key unique to the mobile device, whereby a verification process when performed on the data verifies that the data has been encoded with the key.

3. The method of claim 1, wherein the authorization includes at least one constraining attributes.

4. The method of claim 3, wherein the constraining attribute includes a time constraint.

5. The method of claim 4, wherein the time constraint provides for periods of unauthorized access between periods of authorized access.

6. The method of claim 5, wherein the time constraint provides for periods of authorized and unauthorized access dependent on time of day.

7. The method of claim 5, wherein the time constraint provides for periods of authorized and unauthorized access dependent on calendar day.

8. The method of claim 4, wherein the time constraint identifies an authorization expiration time.

9. The method of claim 3, wherein the constraining attribute includes a location constraint.

10. The method of claim 9, wherein the location constraint is a geographic location constraint.

11. A method of operation of a mobile wireless communications system comprising:
    at a location server, maintaining location information for a mobile device;
    at a requesting entity, sending to the mobile device a request for authorization for receipt of location information;
    sending from the mobile device to the requesting entity an authorization for access to location information, which includes a digital signature verifying the users authorization of access;
    sending a request for location information along with the received authorization from the requesting entity to the location server;
    verifying the digital signature at the location server; and
    releasing the location information to the requesting entity if the request is valid.

12. The method of claim 11, wherein the location server obtains the location information from the wireless device.

13. The method of claim 11, wherein the location server is located within the wireless device.

14. The method of claim 11, wherein the location server obtains the location information from a fixed station of the mobile wireless communications system that is in communication with the wireless device.

15. The method of claim 11:
    wherein the authorization for access to location information includes at least one constraining attribute;
    wherein the step of verifying the digital signature includes verifying at least one constraining attribute; and;
    wherein the step of releasing the location information comprises releasing the location information to the requesting entity if the request is valid and the constraining attribute is satisfied.

16. A communication system comprising:
    a mobile device having a digital signature;
    a location server being effective to maintain location information for the mobile device, the location server having a digital signature verifier for verifying the digital signature of the mobile device; and
    a requesting entity coupled to the mobile device and the location server, the requesting entity being effective to send a first request to the mobile device for an authorization to access the location information, receive the authorization which includes the digital signature from the mobile device in response to the first request, send a second request to the location server for the location information along with the authorization received from the mobile device, and receive the location information from the location server in response to the second request after the digital signature has been verified by the location server.

17. A mobile communications device comprising location server software for storing location data for the mobile communications device, and for making the location data available to requesting entities via a wireless communication link upon receipt of a valid digital certificate when at least one constraint of the digital certificate is valid, wherein the at least one constraint includes a time constraint that provides for periods of unauthorized access between periods of authorized access.

* * * * *